May 12, 1970 R. H. TIMMS 3,511,055
THRUST REVERSER
Filed May 29, 1968 7 Sheets-Sheet 1

RICHARD H. TIMMS
INVENTOR.

BY J. Peter Mohn
ATTORNEY

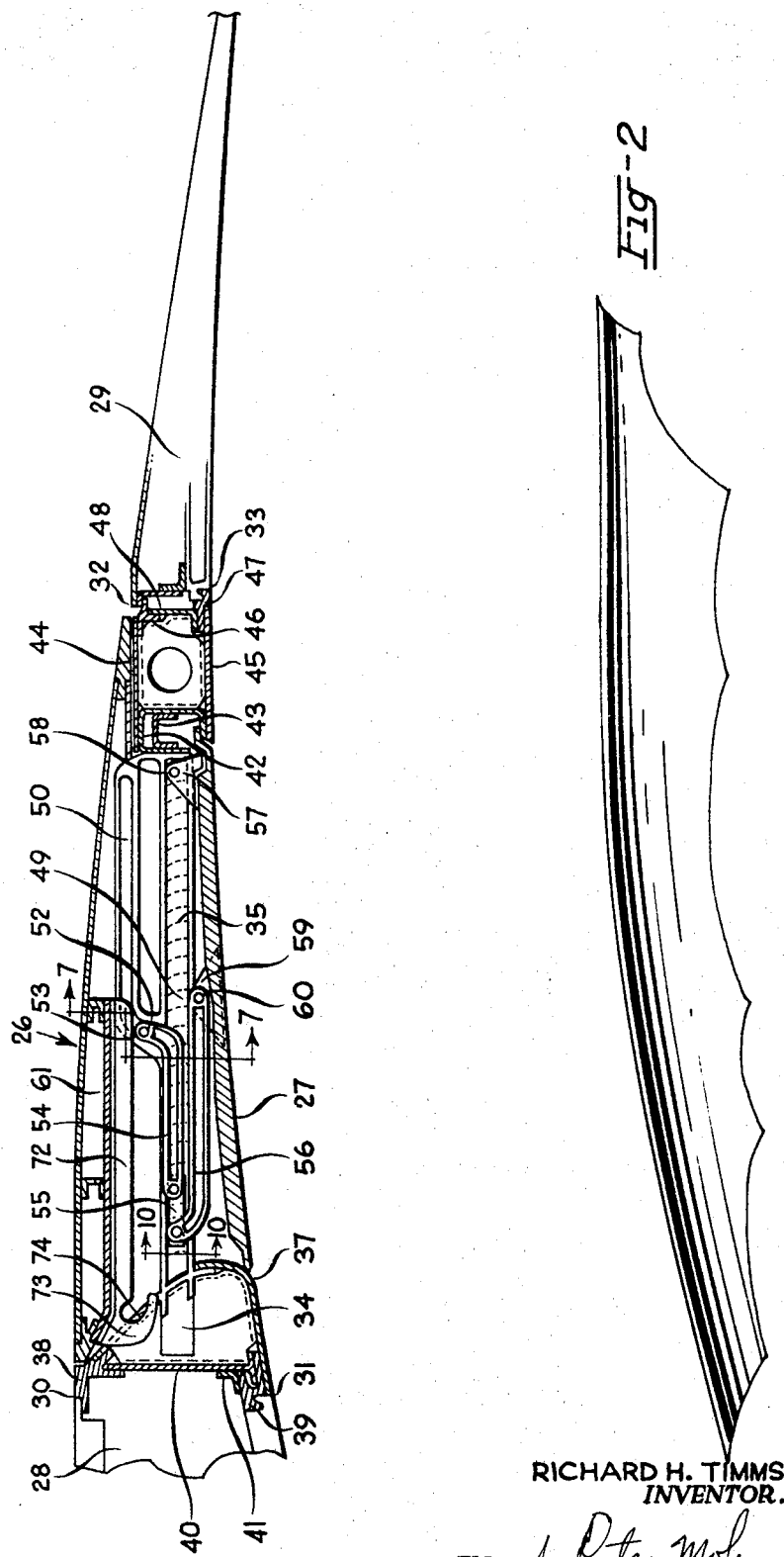

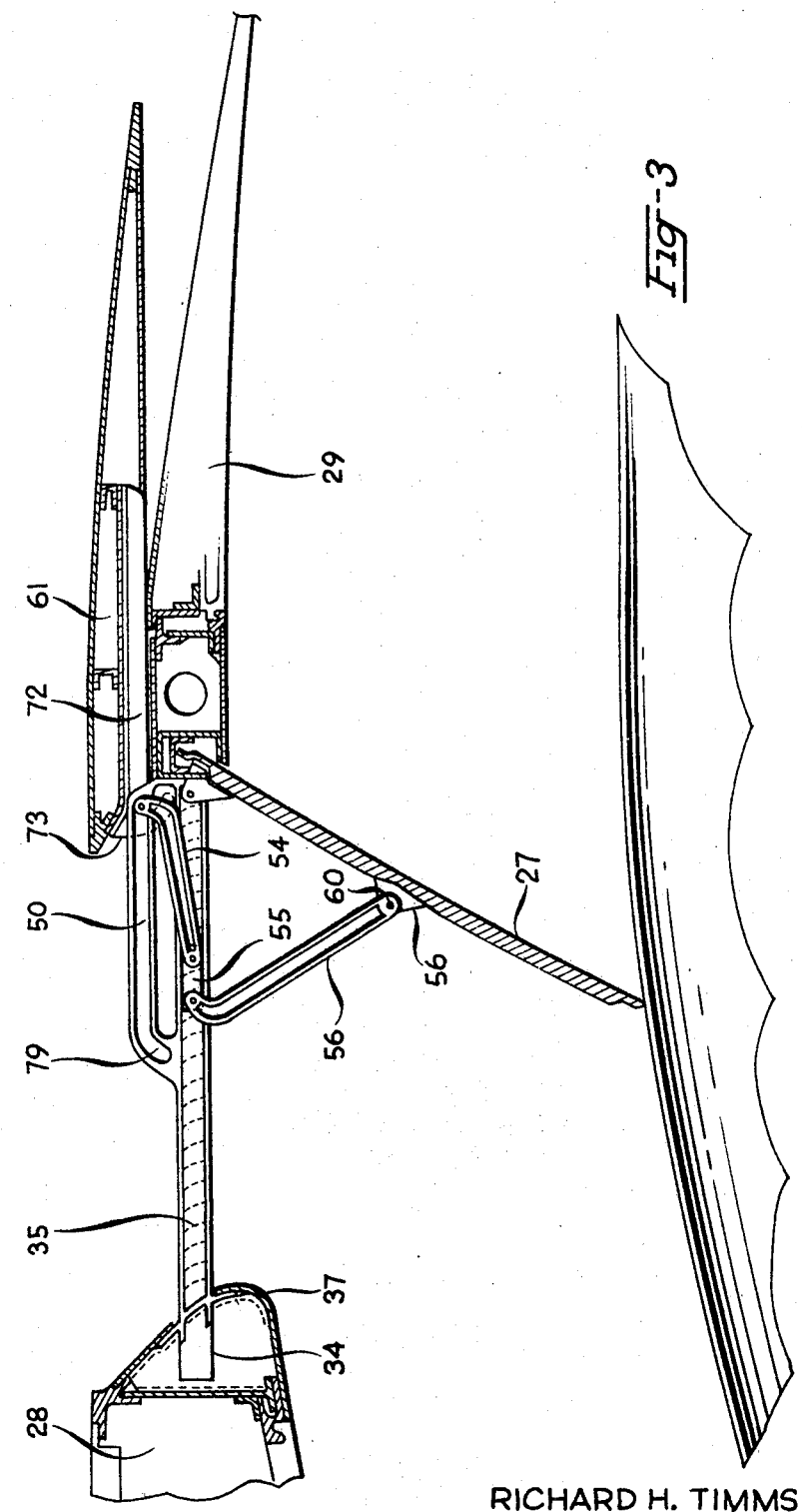

May 12, 1970 R. H. TIMMS 3,511,055
THRUST REVERSER
Filed May 29, 1968 7 Sheets-Sheet 4

RICHARD H. TIMMS
INVENTOR.

BY J. Peter Mohn
ATTORNEY

RICHARD H. TIMMS
INVENTOR.

BY J. Peter Mohn
ATTORNEY

United States Patent Office 3,511,055
Patented May 12, 1970

---

3,511,055
THRUST REVERSER
Richard H. Timms, San Diego, Calif., assignor to Rohr Corporation, Chula Vista, Calif., a corporation of California
Filed May 29, 1968, Ser. No. 733,118
Int. Cl. F02k 1/00, 3/02; B64c 15/04
U.S. Cl. 60—229
9 Claims

ABSTRACT OF THE DISCLOSURE

A thrust reverser arrangement for fan-type jet propulsion engines including a ring of flow reversing cascades which are uncovered when a sleeve section is translated rearwardly on a roller and rail support to a deployed position. During the terminal translational movement of the sleeve section, peripherally disposed blocker doors are rotated into position in the fan duct in such a manner as to divert fan air through the flow reversing cascades. The cascades are located within a center portion of the fan cowling which further includes a forward and aft portion. The operation of the blocker doors is arranged so that the cascades are open and communicating with the bypass duct before the blocker doors reach their deployed positions thereby preventing back pressuring of the engine. All actuators and linkages for achieving the noted operation are supported and contained within the center cowl portion. In order to provide ready access to the jet engine for maintenance purposes, the entire center portion is split into two semi-circular sections and provided with hinges along one common interface.

BACKGROUND OF THE INVENTION

This invention relates generally to thrust reversers for bypass-fan type jet propulsion engines and more particularly to improvements therein. Various thrust reversers of this type have been developed in the prior art in which a translatable cowl portion is moved to expose a ring of flow reversing cascades to which the normal fluid flow through the bypass duct may be diverted. A plurality of blocker doors or flaps, which have been rotated into position to block the bypass duct, are used to divert the fan air. In the known reversers the amount of structure which translates when the reverser is deployed is sometimes substantial. Not only the rear cowl portion but the blocker doors and various links, etc., move in more than one direction. The actuators and the linkages connecting the actuators to the components to be translated may become extensive and occupy substantial space not only in the reverser portion of the cowling but in its forward portion also. It is therefore desirable to minimize the translating components in such reversers and furthermore to confine the reversing structure to a portion of the cowling.

Yet another problem develops in the reversers of the prior art when service or maintenance on the jet engine is required. In the prior art reversers substantial disassembly is many times necessary to gain access to the jet engine. It is therefore also desirable to simplify the manner in which engine access is achievable.

Furthermore it is desirable in all of the reversers to have a failsafe characteristic. The reverser should have a tendency to maintain whatever limits of its operation it is in at a certain time. For example, when deployed and used as a landing roll reverser on a jet airplane, structural failure should not result in loss of the reverse thrust. Similarly, when stowed during cruise conditions of the aircraft to which the reverser is attached, the aerodynamic forces on the device should be such as to maintain the fully stowed position and consequently oppose translation into the reverse thrust mode.

Accordingly, an object of this invention is to provide a thrust reverser for a fan type jet engine having improved structure and operation yet retaining all of the desirable advantages of the known prior art devices.

A further object of this invention is to provide a reverser which occupies a minimum of space within a cowling structure.

A still further object of this invention is to provide a thrust reverser which can readily be removed from its associated engine when access to the engine is desired.

A more particular object of this invention is to provide a compact readily-removable reverser wherein the thrust reversing cascades are substantially exposed before blocker doors divert duct air to the cascades.

SUMMARY OF THE INVENTION

In accordance with this invention, the above objects are achieved by a thrust reverser of unique configuration and construction. The reverser of this invention is intended for use with the fan-type jet propulsion engine of the type having an outer wall and a fan concentric therewith and extended radially beyond said wall. A cowling is arranged to surround the fan and extend coaxially along the central axis of the engine in a spaced manner so that a bypass duct is created between the engine outer wall and the inner surface of the cowling. The cowling is separated into forward, center and aft portions. The center portion contains a ring of flow reversing cascades which are so disposed in an annular opening therein that fan air from the interior of the duct may pass through the cascades to the cowling exterior.

A translatable sleeve section is coaxially mounted on the cowling and arranged to slide by a rail and guide mechanism between the center and aft portions of the cowl. The size of the sleeve is such that it covers the cascades and forms a smooth flow surface over same when it is translated to its forward or cruise position. When translated to the aft position the cascades are uncovered and duct air is permitted to flow therethrough.

A plurality of blocker doors are peripherally disposed and rotatably secured within the duct to the center cowl portion at its aft end. The doors are arranged to rotate into the bypass duct thereby blocking flow through same and diverting the flow through the cascades. Means are supported and contained within the center cowl portion for translating the sleeve and sequentially rotating the blocker doors during the terminal motion of the sleeve. Such an arrangement insures that the cascades are substantially uncovered before the blocker doors begin their blocking function.

The center cowling portion is divided along a longitudinal plane into two substantially semi-circular sections. The two sections are then joined together by hinges and suitable latches to permit ready access to the interior for service purposes.

The above noted objects and features of this invention will be better understood from the ensuing detailed description and claims in conjunction with the attached drawings wherein:

FIG. 2 is an enlarged cross sectional view of a preferred embodiment of a thrust reverser constructed in accordance with this invention showing details of the sleeve translating and blocker door linkages in the cruise position;

FIG. 3 is a view similar to FIG. 2 but showing the reverser in its reverse thrust position;

THE SPECIFICATION

Figure 1:
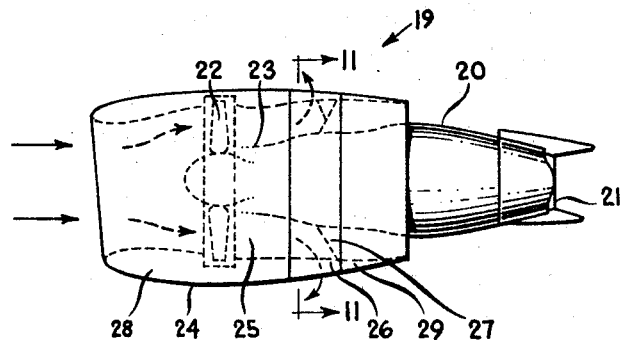
FIG. 1 is an elevation of a fan-type jet propulsion power plant employing the thrust reverser of the present invention.

Referring now to the drawings for a more complete understanding of the invention, and first more particularly to FIG. 1, a fan type jet propulsion engine generally designated 19 is shown. Details of how the engine is attached to an aircraft or other device to be propelled are not shown since they form no part of the present invention. The fan engine comprises the jet engine 20 which discharges a gaseous effluent through nozzle 21 to provide thrust. Thrust in the particular type of engine for which this invention is intended is augmented by air flow from a fan 22 driven by the engine and disposed concentric therewith and extending radially beyond the outer wall thereof. A cowling generally designated 24 is spaced from and suitably supported on the engine 20 to form a bypass duct 25 for flow of fan air. By diverting the fan air and causing it to exit in a direction opposite to that of the normal thrust the reverse thrust is created. In FIG. 1 the portion of the cowling which contains the apparatus necessary for developing the reverse thrust is designated 26. Furthermore, in FIG. 1 the doors 27 which are used to block the flow of fan air air through the duct are shown schematically in phantom in their deployed position. The arrows on the figure generally indicate flow of duct or fan air during reverser operation.

It shouuld be further noted in FIG. 1 that the cowling generally designated 24 is broken into three portions, a forward portion 28, the noted center portion 26 and a rearward or aft portion 29. As will be better understood from the detailed description of the other drawings which follows, within the scope of this invention the entire reverser mechanism is contained within the center portion 26 of the cowling. The terminology "entire reverser," as used here, comprehends all mechanism including actuators that are use to achieve the desired operation.

It should be noted at this point that throughout the drawings and specification, the same numerals will be used in the various figures to indicate the identical element or part.

Referring now to FIGS. 2 through 11 the detailed structure of the thrust reverser of this invention will be better understood. The center portion 26 of the cowling is attached between the forward portion 28 and aft portion 29 in a fixed manner as best indicated in FIGS. 2 through 5. At point 31 the center portion is attached at its forward end to the forward cowl poriton 28. As shown in the figures, suitable interlocking and overlapping joints such as at 30 and 31 are provided to rigidly attach the adjoining sections. It should be emphasized at this point that the cowling structure is off course of substantially cylindrical configuration and hence many of the parts thereof extend in an arcuate manner about the entire circumference of the cowling structure. At the aft end of the center portion a rigid attachment is made to aft cowl 29 at points 32 and 33 in a manner similar to that used at the forward end. Between the two extremities, that is the aft end of the forward portion and the forward end of the aft portion, the primary structural components of the center cowling portion are the rigid cascade panels 34.

In the preferred embodiment, a plurality of such panels 34 are peripherally disposed to form substantially a cylinder. Each cascade panel 34 has numerous vanes or cascades such as 35 which are so shaped as to deflect fan air in a reverse direction when the air is forced through them. Each panel 34 also includes a right-angle raised portion 36 along each of its longitudinal edges for purposes to be described later.

Figure 11:
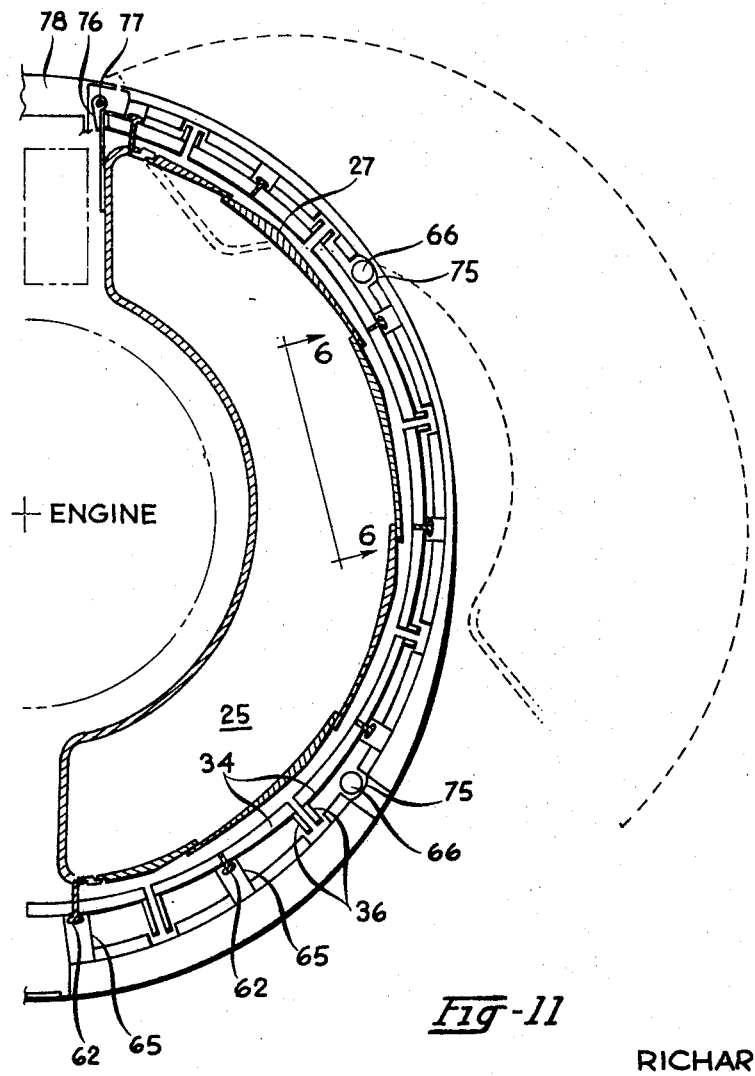
FIG. 11 is a semi-schematic cross-section view taken along line 11—11 of FIG. 1 and showing in phantom the hinged cowl.

The cascade panels are attached to the forward cowl portion 28 by a ring of suitable structural components including curved sheeting section 37, molding or channel members 38 and 39, T-shaped member 40 and angle member 41. Each panel is separated from an adjacent panel sufficiently to provide a space for the blocker door actuating linkage, to be described. The overall arrangement is best visualized at this point by reference to FIG. 11 wherein a sectional view of half of the center cowl is somewhat schematically illustrated. In FIG. 11 a pair of adjacent panels 34 having spaced adjacent raised portions 36 are shown.

Referring to FIGS. 2 through 5, at the downstream or aft end of the center cowling the cascade panels 34 are secured to the rear cowl 29 through a ring of structure including channels 42 and 43, flat ring members 44 and 45, moulding or bracket members 46 and 47 and angle member 48.

At this point therefor the center cowl portion has been described as a cylinder made up of a plurality of spaced cascade panels 34 rigidly supported between forward and aft structural rings.

Figure 7:
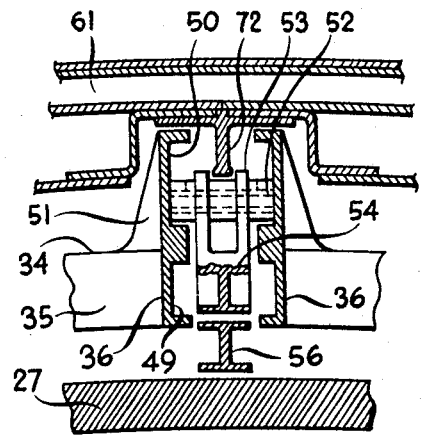
FIG. 7 is an enlarged sectional view taken along line 7—7 of FIG. 2 and showing details of the track and roller structure.

As has been noted previously, between the adjacent cascade panel section is located the actuating linkage for the blocker doors. Referring particularly to FIG. 7, the cross-sectional view of a pair of adjacent raised edges 36 shows them to include a first or lower track 49 and a second or upper track 50. The track sections are suitably reinforced by webbing such as 51. With each pair of adjacent track sections a suitable race is formed for receiving a roller 52. Roller 52 is rotatably mounted at the end 53 of the rigid linking bar 54. The bar 54 is typically of "I-beam" cross-section for structural strength as can be seen in FIG. 7.

Raised portion 36 includes both the upper track 50 and lower track 49 for substantially half of its total longitudinal dimension as can best be seen in FIGS. 2 and 3. The two track section essentially extends along the downstream or aft half. On the forward portion a single lower track 49 is provided. Lower track 49 however extends for substantially the entire cascade longitudinal dimension and receives a sliding block 55 to which linking bar 54 and blocker door link 56 are pivotally secured.

It should be noted that track 50 is curved downward at its forward end as best indicated in FIG. 3. The downward curved portion of the track functions to prevent the blocker doors from deploying before the cascades are exposed as will be better understood from the further detailed description to follow.

Figure 6:
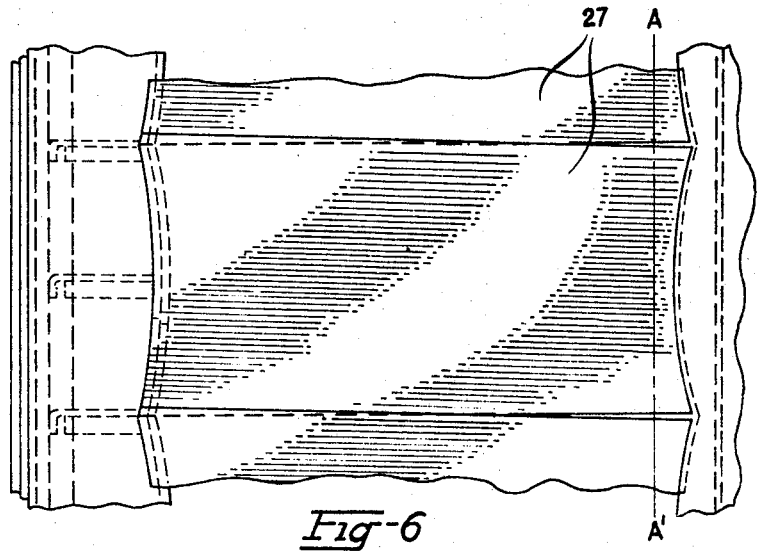
FIG. 6 is an elevational view of the interior of a section of the cowling center portion taken along the line 6—6 of FIG. 11.

Block door 27 is rotatably secured along axis A–A' of FIG. 6 by bracket 57 and pin 58 at the downstream end of the door. The blocker door linking bar 56 is secured to the interior of the door 27 by bracket 59 and pin 60.

Blocker doors 27 are so shaped as to smoothly nest within the bypass duct outer wall, i.e., the inner wall of the cowling, in the stowed mode. Furthermore, their shape is so designed to permit them to cooperate in such a manner as to block substantially all duct flow and divert same to the cascades when deployed. FIGS. 6 and 11 show the overlapping arrangement used to achieve the noted results.

Coaxially supported about the cowling is a translatable sleeve section generally designated 61. When sleeve 61 is translated to its forward position it covers the cascades 35 and provides an aerodynamically smooth outer surface for the cowling as can be noted in FIG. 2. When translated downstream, or to its aft position, the sleeve section 61 uncovers the cascades 35 and permits flow through the resultant openings. FIG. 3 best shows the sleeve 61 in its downstream position. The translation of the sleeve 61 takes place along a rail and guide arrangement. Extending for substantially the entire longitudinal dimension of the cascade panels are a plurality of rails, best seen in FIGS. 4 and 11. In the preferred embodiment, the rails are formed as part of the cascade panels, i.e., a single cast component. It should be understood that any manner of securing the rails to the cascade panels 34, or more generally to the center cowling portion 26, would be suitable. The number of rails utilized need not be precisely as shown either but should merely be dictated by good engineering practices. In the embodiment shown a rail 62 is provided at each cascade panel 34.

Figure 4:
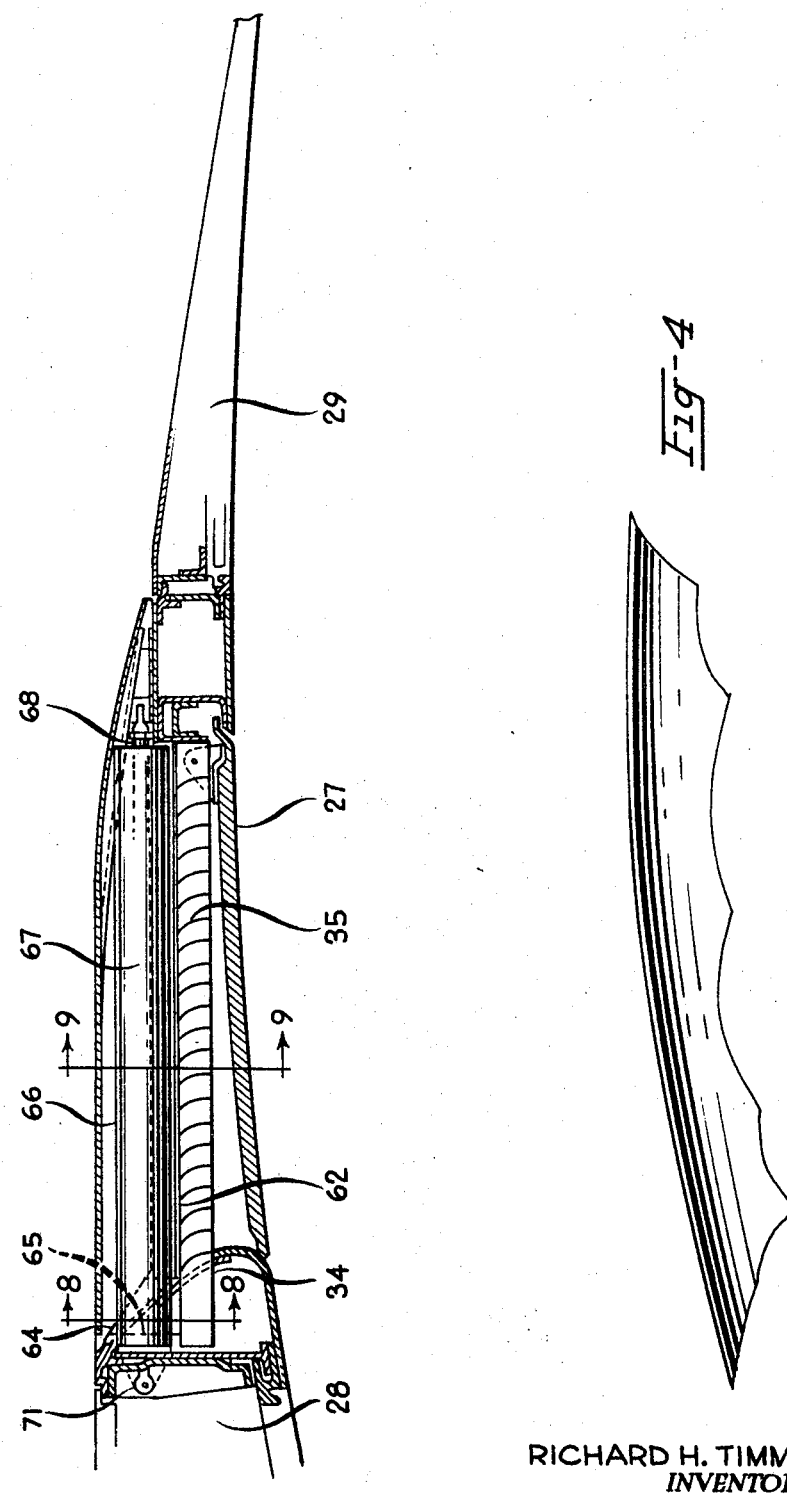
FIG. 4 is an enlarged cross-sectional view similar to FIG. 2 but taken along a different section plane and showing details of the actuator mechanism in cruise position.
Figure 8:
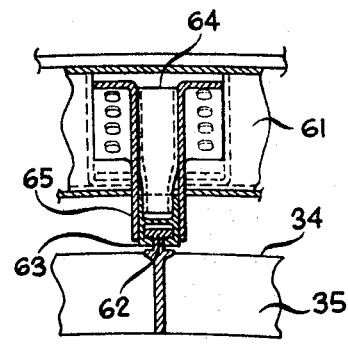
FIG. 8 is an enlarged sectional view taken along line 8—8 of FIG. 4 and showing details of the rail and guide arrangement by which the sleeve translates.
Figure 9:
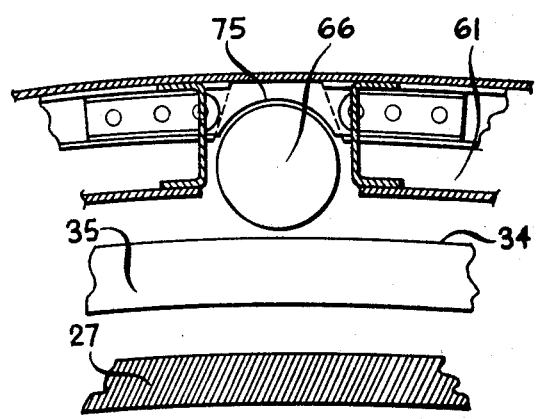
FIG. 9 is an enlarged sectional view taken along line 9—9 of FIG. 4 and showing the arrangement of an actuator within the center cowl portion.
Figure 10:
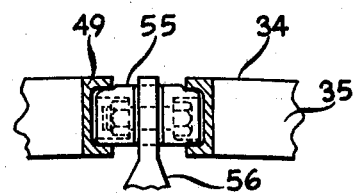
FIG. 10 is an enlarged cross-sectional view taken along line 10—10 of FIG. 2 showing details of the track and sliding block structure.

Referring now to FIG. 8, associated with each rail is a mating guide 63 supported on the forward and inner leading edge of the sleeve section 61, at 64 in FIG. 4, by a suitable bracket 65. The brackets 65 and guides 63 are peripherally spaced about the inner surface of the sleeve 61 as at the noted forward points. Each guide 63 is arranged to slide freely along its mating rail 62.

Reference should now be made to FIGS. 3 and 4 wherein details of the actuator 66 mounting are shown. It should be noted at this point that the particular form of actuating device utilized is a matter of choice. In the particular embodiment shown a hydraulic type actuator 66 is utilized. A screw-type actuating device could be substituted, however, with no change in the desired results.

Figure 5:
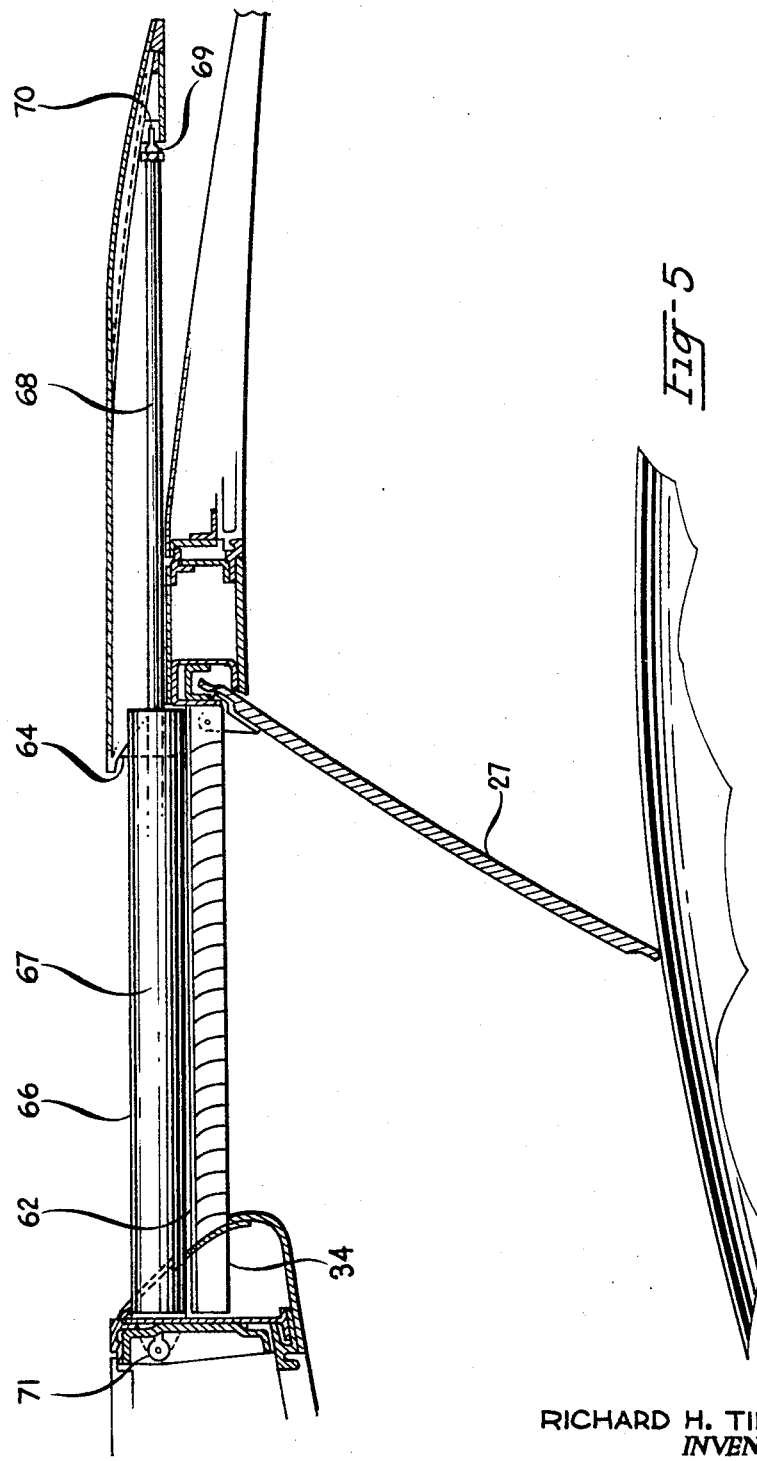
FIG. 5 is a cross-sectional view similar to FIG. 4 but showing the reverser in the deployed or reverse thrust position.

Actuator 66 includes a cylinder 67 and a piston, not shown, to which a shaft 68 is operably connected as a structural extension thereof. Shaft 68 is attached at its aft or downstream extremity, or tip, 69 by a suitable mounting bracket 70 to the aft end of sleeve section 61. The cylinder 67 is attached at the forward wall of the center cowling 26 by a suitable bracket or pivot 71. Upon energization, shaft 68 is extended from cylinder 67 thereby translating sleeve section along its rail-guide structure to its downstream or aft position as shown in FIG. 5.

The number of actuators 66 utilized in a device made in accordance with this invention is a matter of choice depending on the size of structure involved, etc. As can be noted in FIG. 11, the particular embodiment herein disclosed utilizes four actuators 66, two in each half of the cowling. As can be noted in FIGS. 9 and 11, suitable recesses or channels 75 are provided in the sleeve 61 for receiving the actuators 66.

Fastened along the inner surface of the sleeve section for a substantial portion thereof is a generally "T-shaped" hooking structure 72. "T-shaped" member 72 at its forward end is provided with a hook-shaped extension. Extension 73 has an upward-curved cutout or race 74 so sized as to matingly engage with roller 52 as will be understood from the description of the operation of the instant invention to follow.

Referring now to FIG. 11, an important feature of this invention can be seen. The overall center cowl portion is divided along a longitudinal plane into two substantially semicircular sections. One such section is shown in FIG. 11 but it should be understood that a mating section is also included to form the entire cowl.

At the uppermost extremity, each semi-circular section is pivotably secured by a hinge bracket 76 and pin 77 to the other mating semi-circular section along their common interface. In actuality, each section may be hinged to a central pylon portion 78. The sections, furthermore, may not be precise semicircles for structural reasons. They are however contemplated as being substantially semicircular. In the closed position the two sections are rigidly connected, by structure not shown, to form one integral center cowl. Such connecting structure would take the form of suitable screws, latches, etc.

When in an open position, as shown in phantom in FIG. 11, access is readily available to the inner jet engine for maintenance, etc. It should be noted that the entire center cowl, i.e., duct, cascades, sleeve, etc., swings away from the engine in accordance with this invention.

It should further be noted that although details of materials used for the various component parts have not been disclosed, any suitable ones could be used depending on the particular installation. For example, honeycomb sandwich could be used for the blocker doors, sleeve, etc.

Having thus described the structure of this invention a brief description of its sequence of operation should further enhance understanding of same.

Operation

The sequence of operations and translations, etc. which occur when a reverser constructed in accordance with this invention is deployed is shown in the series of schematic FIGS. 12–15.

Figure 12:
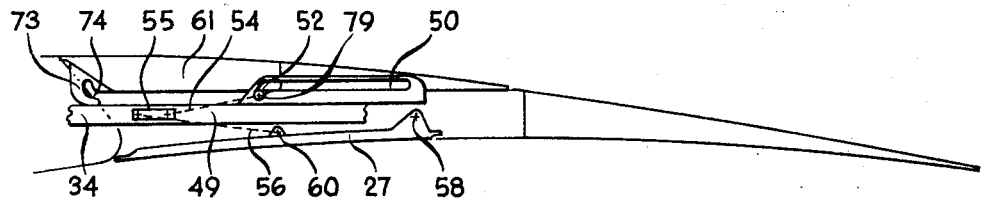
FIGS. 12 through 15 illustrate in schematic form the sequence of operations of the thrust reverser of this invention.

In FIG. 12, the sleeve section is in its forward position and the blocker doors are accordingly closed. The reverser is essentially locked in this stowed position since roller 52 is confined to the downward curved extremity 79 of track 50 by the rearward inner surface 80 of the sleeve hooking structure.

Figure 13:
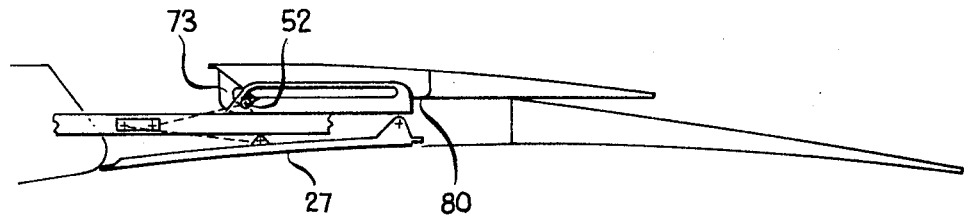

In FIG. 13 the sleeve 61 is translated downstream to approximately halfway to its fully extended position. In that position, the cascades are partially uncovered as can be noted. Extension 73 having upward race 74 is just beginning to engage roller 52 at this point thereby imparting a lifting motion to it. Blocker door 27 is still stowed.

Figure 14:
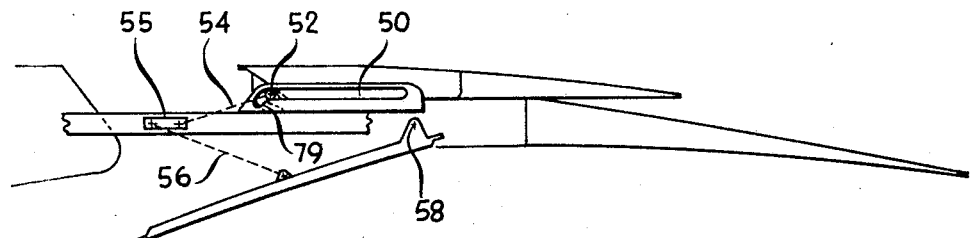

In FIG. 14, roller 52 has been lifted out of the forward downward portion 79 of track 50 and is beginning to translate with the sleeve. With translation of roller 52, rigid link 54 imparts translation to slider 55 in its respective track 49. It follows that as slider 55 translates, rigid link 56 to the blocker door 27 causes the latter to rotate abou its pivot 58 and drop into the duct.

Figure 15:
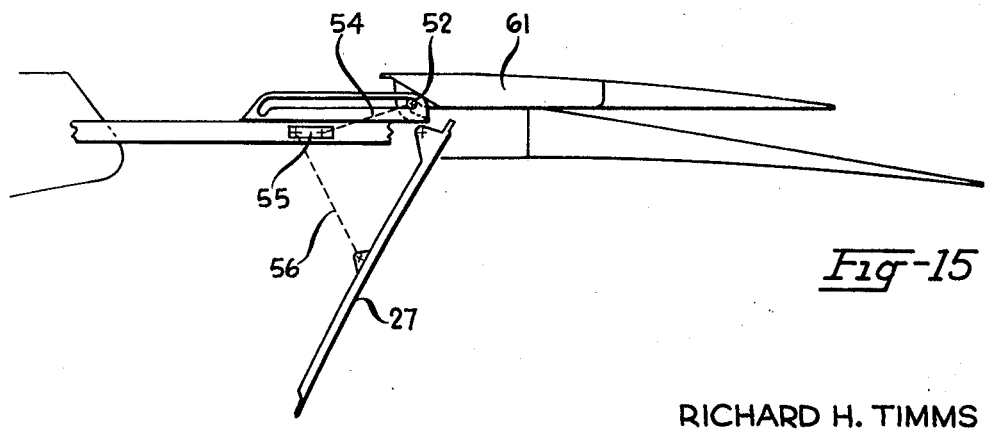

Finally, in FIG. 15, the translation of the sleeve 61 is completed with the result that door 27 is fully deployed in the duct, thereby diverting duct flow through the cascades.

The return of the reverser to the stowed position follows the same sequence, but in reverse order.

It can be noted at this point that doors 27 do not deploy until the terminal motion of sleeve 61 is occurring, thereby preventing backpressuring of the engine.

It should also be noted that the reverser of this invention achieves the desired fail-safe operating characteristic in both its stowed and deployed mode. In the deployed mode, because of the downstream pivoting of the blocker door, bypass air tends to maintain the reverse thrust mde, once it's so deployed.

The stowed mode fail-safe characteristic results from the noted locking action in the track and roller structure and normal positive pressure within the bypass duct.

It should therefore be apparent that in accordance with this invention a thrust reverser which achieves all of the previously noted objects has been described.

Although the invention has been shown and described in terms of a particular embodiment thereof, it should not be limited thereto, for various changes and modifications could be made by one having ordinary skill in the art without departing from the spirit and scope of this invention as defined in the following claims:

What is claimed is:

1. A thrust reverser for a fan type jet propulsion engine having an outer wall and a fan concentric therewith and extending radially beyond said wall comprising:
   a cowling surrounding said fan and extending coaxially along the central axis of said engine in spaced relationship from said engine outer wall to form a bypass duct and separated into forward, center and aft portions,
   said center portion having an annular opening therein for communicating said duct with the exterior of said cowl and including a ring of flow-reversing cascades disposed within said opening,
   a translatable sleeve section coaxially mounted on said cowling and arranged to slidably translate between said center and aft portions thereof,
   said sleeve being of such size as to cover said cascades when disposed in cruise position over said center portion and to simultaneously form a smooth flow surface between said forward and aft cowl portions,
   said sleeve further being arranged to uncover said cascades when translated downstream over said aft cowl portion,
   a plurality of blocker doors rotatably secured to said center cowl portion at its aft end,
   said doors being arranged to rotate into said bypass duct thereby blocking flow through said duct and diverting said flow through said cascades,
   means supported and contained within said center cowl portion for translating said sleeve and sequentially rotating said doors during the terminal motion of said sleeve, whereby said cascades are substantially uncovered before said doors divert flow from said duct,
   said translating and rotating means comprising:
   a plurality of actuators peripherally disposed in said center portion and operably connected between the forward end of said center portion and said sleeve section and arranged to translate said sleeve section to its forward or aft position when provided with an appropriate energizing control.
   a plurality of hooking structures peripherally disposed on and rigidly attached to said sleeve section at its forward end,
   a like plurality of mating roller structures for engagment with said hooking structures,
   a plurality of means for linking said roller structures to respective ones of said blocker doors, said roller structures being positioned substantially aft of said hooking structures when said sleeve is translated to its forward position,
   whereby translation of said sleeve is accompanied by engagement of said hooking structure with said roller structure after a substantial portion of said cascades have been uncovered.

2. The thrust reverser of claim 1 wherein said actuators comprise hydraulic cylinder and piston types.

3. The thrust reverser of claim 1 further including:
   a plurality of rails rigidly attached and peripherally spaced about the exterior of said center portion,
   said rails extending longitudinally along said center portion,
   a plurality of guides for mating with said rails supported on the interior of said sleeve section whereby said sleeve section is arranged to translate by guiding along said rails.

4. The thrust reverser of claim 1 wherein said center cowl portion is divided along a longitudinal plane into two substantially semicircular sections,
   said two sections being joined along one common interface by a hinge,
   said two sections normally being closed together to form substantially a cylinder,
   whereby said center cowl portion may be hinged apart for access to the jet propulsion engine within.

5. The thrust reverser of claim 1 wherein said sleeve section is provided with a plurality of peripherally spaced longitudinal channels on its inner surface for receiving said actuators.

6. The thrust reverser of claim 1 wherein said blocker doors when in cruise position are stowed in sealing relationship against the inner side of said center cowl portion and form a substantially streamlined wall of said bypass duct.

7. The thrust reverser of claim 1 wherein each of said means for linking comprises:
   a track disposed in a plane parallel to the direction of translation of said sleeve section,
   a slider secured in sliding relationship to said track,
   a first rigid bar extending from said roller structure to said slider and being pivotably attached to said roller structure and said slider at its respective ends,
   a second rigid bar extending from said slider to said blocker door and being pivotably secured to said slider and said door at its respective ends,
   whereby movement of said roller structure is accompanied by sliding of said slider in said track and resultant movement of said blocker door.

8. The thrust reverser of claim 7 wherein each track is rigidly attached to said ring of cascades in a peripherally spaced manner.

9. The thrust reverser of claim 7 wherein associated with each said track is another parallel track for receiving and guiding said roller structures.

References Cited

UNITED STATES PATENTS

| | | | |
|---|---|---|---|
| 2,178,998 | 11/1939 | Scott | 244—53 |
| 2,783,003 | 2/1957 | Ralston et al. | |
| 2,944,766 | 7/1960 | Freeding et al. | |
| 3,036,431 | 5/1962 | Vdolek | 60—229 |
| 3,262,270 | 7/1966 | Beavers | 60—226 |

MARK NEWMAN, Primary Examiner

A. D. HERRMANN, Assistant Examiner

U.S. Cl. X.R.

60—226, 39.31; 239—265.29, 265.31